United States Patent [19]

Szyjkowski

[11] Patent Number: 5,361,541
[45] Date of Patent: Nov. 8, 1994

[54] UNIVERSAL, SPRING LOADED ACCESS DOOR

[75] Inventor: Jerzy Szyjkowski, Brampton, Canada

[73] Assignee: Superflex, Inc., St. Charles, Ill.

[21] Appl. No.: 992,917

[22] Filed: Dec. 18, 1992

[51] Int. Cl.5 .............................................. E06B 9/00
[52] U.S. Cl. ..................................... 49/465; 52/220.8
[58] Field of Search .................. 52/202, 514, 302.7, 52/220.1, 220.8, 208, 514.5; 49/463, 465

[56] References Cited

U.S. PATENT DOCUMENTS

| 3,340,661 | 9/1967 | Krieger . | |
| 3,383,811 | 5/1968 | Ades | 49/465 |
| 3,704,563 | 12/1972 | Waller . | |
| 4,113,303 | 9/1978 | Yench | 49/465 |
| 4,890,418 | 1/1990 | Sachs | 49/463 |
| 4,970,836 | 11/1990 | Brown | 52/208 |

FOREIGN PATENT DOCUMENTS

| 2424372 | 12/1979 | France | 49/465 |
| 1134151 | 11/1968 | United Kingdom | 49/465 |

Primary Examiner—Michael Safavi
Attorney, Agent, or Firm—Barrigar & Moss

[57] ABSTRACT

A removable access door for covering small openings in walls and ceilings includes a panel member and at least two devices for removably attaching the panel member to the structure. Each device includes a clamping member pivotally mounted adjacent a side edge of the panel and an engagement member for pivoting the clamping member from a first position that permits the clamping member to be inserted into the opening towards a second position where the clamping member extends behind an edge section of the structure. The engagement member is connected to its respective clamping member and is movable to an initial position to engage and be actuated by an edge section of the structure as the attaching device is inserted into the opening. A spring biases the attaching devices to swing the clamping members to the second position and releasably clamp the edge sections. The door can be easily removed with the use of a screwdriver inserted behind the edge of the panel.

16 Claims, 2 Drawing Sheets

UNIVERSAL, SPRING LOADED ACCESS DOOR

BACKGROUND OF THE INVENTION

This invention relates to removable access doors for covering an opening in a structure such as a wall or ceiling.

Newly constructed houses are in many cases being provided with a roughed-in central vacuum system. In many cases the roughed-in system leaves unmasked holes in the walls of the house. These holes are eventually used to install a plug-in socket for the central vacuum system. The access door disclosed herein provides a simple and inexpensive means for neatly covering these wall openings, at least until the vacuum system is installed.

Also, when a basement is finished in a house, it is desirable to cover or hide a number of devices and mechanisms that are often found in a basement. For example, many basements contain main water shut-off valves, sewer clean-outs and heating duct throttles. Even though it is desirable to cover these items to improve the appearance of the basement, access to these items or appliances must be maintained. Again, the access door disclosed herein proves a useful mechanism for maintaining easy accessibility to these devices.

SUMMARY OF THE INVENTION

According to the invention, a removable access door for covering an opening in a structure comprises a panel member having opposite side edges and means for removably attaching the panel member to the structure in order to cover the opening. The attaching mechanism includes clamping members pivotally mounted on one side of the panel member adjacent opposite side edges and engagement members for pivoting the clamping members from a first position that permits the clamping members to be inserted into the opening towards a second position where each clamping member extends behind an edge section of the structure. Each engagement member is connected to a respective clamping member and is movable to an initial position to engage and be actuated by an edge section of the structure as the attaching means is inserted into the opening. There are also means for biasing the attaching mechanisms to swing the clamping members to the second position and releasably clamp the edge sections of the structure between the panel member and the clamping members. The access door can be removed from the opening by pulling door away from the opening and overcoming a force applied to the attaching mechanism by the biasing means.

In a preferred embodiment, a coil spring is attached to each engagement member and provides the biasing means.

In another aspect of the invention, a removable access door for covering a suitable opening in a structure comprises a panel member having first and second sides and opposite side edges. There are means for removably attaching the panel member to the structure in order to cover the opening, these means including clamping members pivotally mounted on the first side of the panel member, each at a respective one of the side edges and engagement members for pivoting the clamping members from a first position that permits the clamping members to be inserted into the opening towards a second position where each clamping member extends behind an edge section of the structure. Each engagement member is connected to a respective clamping member and is movable to an initial position to engage and to be actuated by an edge section of the structure as said attaching means is inserted into the opening. There are also means for pivotally supporting each clamping men%her with these supporting means being rigidly connected to the first side. There is also a spring capable of pivoting each clamping member to the second position and causing the adjacent edge section of the structure to be clamped between the first side of the panel member and the clamping member. The door can be removed from the opening by pulling thereon and overcoming a clamping force generated by the spring.

The present access door can be used in openings defined by different thickness of materials that are generally used for finishing walls and ceilings provided the opening is made adequately large. If desired, the external surface of the access door can be painted, wallpapered or sprayed with texture, making it less visible when installed. At the same time, because the panel of the access door does jut out from the adjacent surface of the wall or ceiling, the access door is easy to locate when this is required.

Further features and advantages will become apparent from the following detailed description taken in conjunction with the accompanying drawings.

DETAILED DESCRIPTION OF PREFERRED EMBODIMENTS

Figure 1:
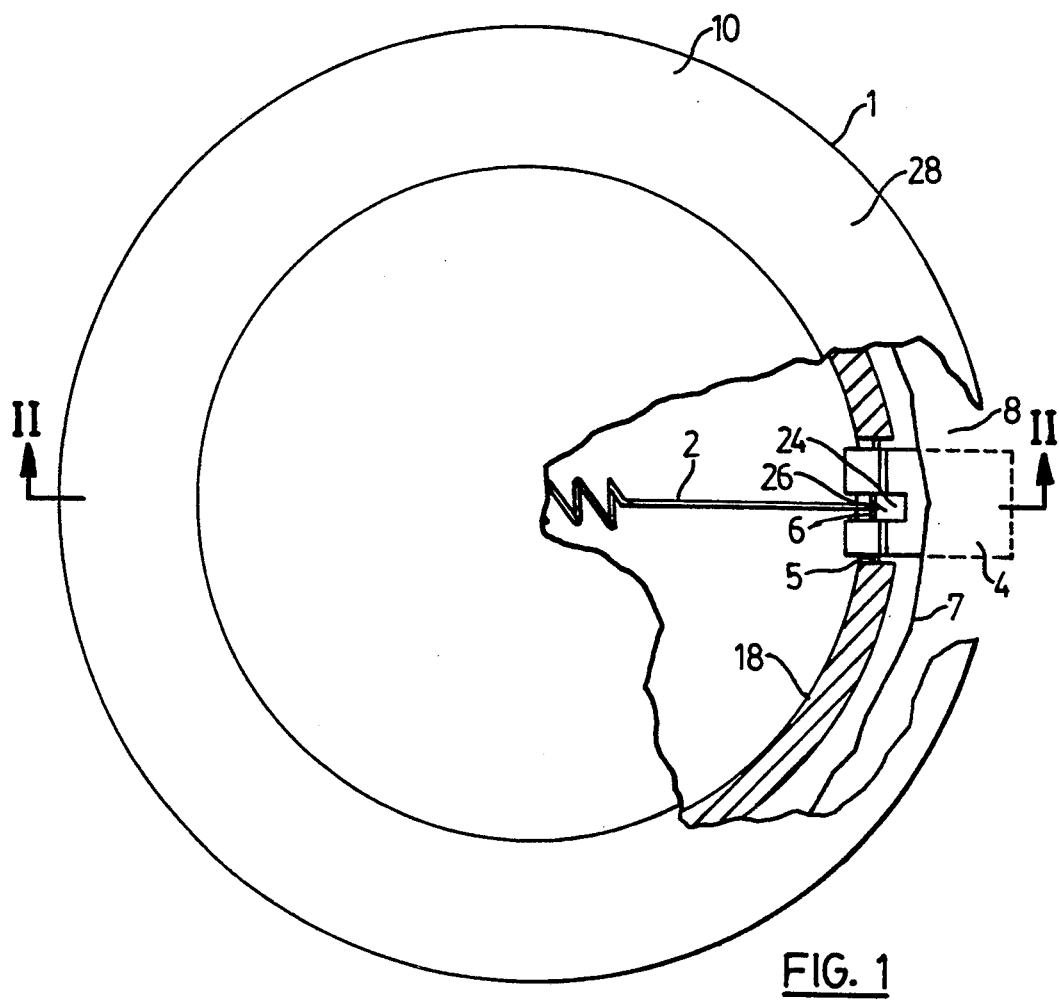
FIG. 1 is a side elevation, partially in section, showing a preferred embodiment of the invention installed in a wall opening.
Figure 2:
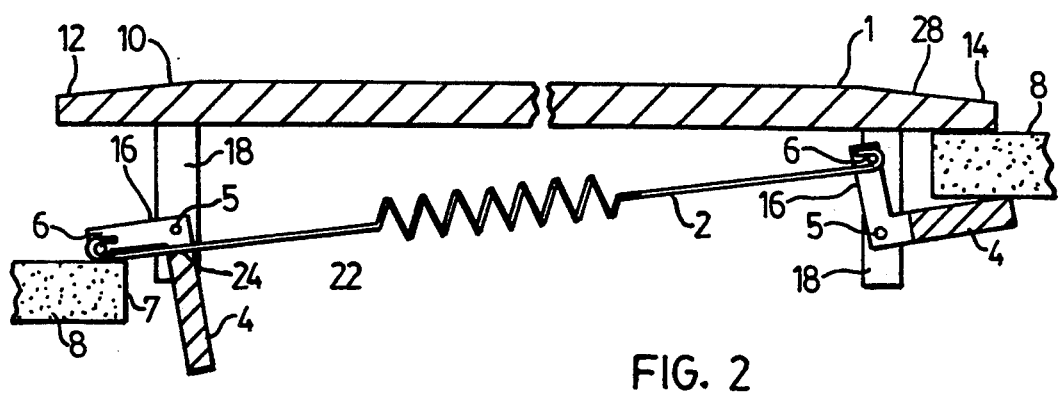
FIG. 2 is a cross-sectional view of the embodiment of FIG. 1 taken along the line II—II of FIG. 1, wherein the left side illustrates the position of the clamping member prior to installation of the access door and the right side shows the position of the clamping member after the door has been installed.

As shown in FIGS. 1 and 2, a removable access door 1 can be used to cover an opening 7 in a structure such as the wall or ceiling of a building. The door includes a flat panel member 10 having opposite side edges indicated at 12 and 14 in FIG. 2. The door is equipped with means for removably attaching the panel member 10 to the wall structure in order to cover the opening 7. The attaching means includes gripping arms or clamping members 4 which are pivotally mounted on the inner side of the panel member adjacent the opposite side edges 12 and 14. Each attaching mechanism also includes an engagement member 16 for pivoting the clamping member from a first position (shown on the left side of FIG. 2) that permits the clamping member to be inserted into the opening 7 towards a second position (shown on the right side of FIG. 2) where the clamping member extends behind an edge section 8 of the wall. Each engagement member 16 is connected to its respective clamping member 4 and in the illustrated preferred embodiment the clamping member and its respective engagement member together form an integral L-shaped member with both the clamping member and its engagement member extending from a pivot axis formed by the hinge pin or pivot pin 5 about which both members are pivotable. It will be understood that each engagement member is movable to an initial position (shown on the left side of FIG. 2) to engage and be actuated by the edge section 8 of the structure as the attaching mechanism is inserted into the opening 7.

The access door 1 also has means for biasing the attaching devices to swing the clamping members 4 to the second position and releasably clamp the edge sections 8 of the wall between the panel member 10 and the clamping members 4. As illustrated, the biasing means comprises a coil spring 2, which spring is connected at each end thereof to one of the engagement members 16 by means of a connecting pin 6 located near the end of the engagement member which is furthest from the hinge pin 5. It will be understood that with this arrangement the access door 1 can easily be removed from the opening 7 by simply pulling the access door away from the opening and overcoming a force applied to each attaching mechanism by the spring 2.

Figure 3:
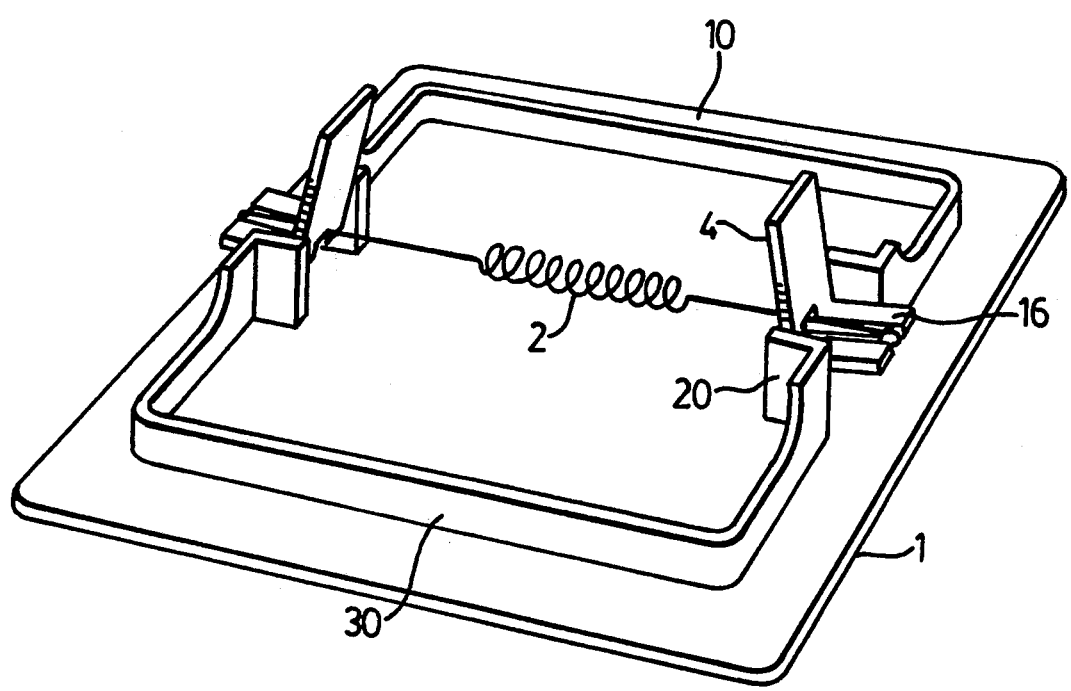
FIG. 3 is a perspective view of another embodiment of the invention wherein the access door is square, this embodiment being intended for use in a square wall opening, this view showing the rear of the access door.

As illustrated in FIGS. 2 and 3, the attaching mechanism includes supporting means or members 18 or 20 rigidly mounted on the inner side of the panel member and projecting inwardly therefrom, that is in the direction of the wall opening. The clamping members 4 are pivotally mounted on these support members. In both illustrated embodiments the support member is part of a peripherally extending flange or rim, which is circular in the embodiment of FIGS. 1 and 2 and square in the embodiment of FIG. 3.

As illustrated in FIG. 2, in the first position of the clamping member, each clamping member 4 is held in place by the spring 2 pulling on the respective engagement member 16 with the spring being positioned relative to the engagement member and the pivot axis (located at pin 5) so that the pulling force of the spring on the engagement member 16 tends to pivot the respective clamping member 4 about the pivot axis in the direction of the first position. In other words, the pulling force of the spring keeps the clamping member resting against a straight extension 22 of the spring. Then, when the access door is being pushed into the opening 7, the engagement member 16 engages against and is pushed by the surface of the edge section 8 so that it pivots around the hinge pin 5 (in the clockwise direction as viewed on the left hand side FIG. 2). Once the vector of the pulling force of the spring passes by the position of the hinge pin 5, the gripping arm or clamping member 4 will then be pivoted by the spring until it rests on the internal surface of the edge section 8 as shown on the right hand side of FIG. 2. The access door will then be secured in position with the continuous pulling force of the spring 2 keeping the door in place.

If one wishes to remove the access door from the opening, it is simply necessary to pull the door away from the opening and overcome the force applied to the attachment mechanisms by the spring. When a pulling force is applied, the clamping members will be pulled back against the spring force resulting in an automatic release of the door from the opening.

It will be noted from FIG. 2 that a stop is formed at 24 by each clamping member, this stop acting to limit the pivotable movement of the clamping member about the pivot axis formed by hinge pin 5 when the clamping member 4 has reached the first position. The stop is formed by an inner edge of the clamping member, said edge being located at the end of a central slot 26.

In the embodiment shown in FIGS. 1 and 2, the panel member 10 has a peripheral edge section indicated at 28 which is tapered in the radial outwards direction so that the peripheral edge of the panel member is thinner than a central area thereof.

As indicated above, the support members for the clamping members can be part of a peripherally extending flange indicated at 30 in FIG. 3. This flange projects perpendicularly from the rear surface of the panel member 10 and is spaced from the adjacent side edge of the panel member.

As can be seen from FIGS. 1 and 2, each engagement member 16 is split longitudinally by the central slot 26. The connecting pin 6 extends across this slot.

The access door 1 can be made in many shapes and sizes. They can also be equipped with further attachment mechanisms which can be connected or individually mounted.

Access doors constructed in accordance with the invention can be used in conjunction with drywall, panelling, wall and ceiling tiles, siding and wainscotting.

In order to remove the access door from the opening, a simple tool such as a nail or screwdriver can be inserted under an edge of the door and can be used to help pull out the door from the opening.

It will be clear to those skilled in the art that various modifications and changes could be made to the access door as described herein. Accordingly, all such modifications and changes as fall within the scope of the appended claims are intended to be part of this invention.

I claim:

1. A removable access door for covering an opening in a structure comprising a panel member having opposite side edges, attaching means for removably attaching said panel member to said structure in order to cover said opening, said attaching means including clamping members pivotally mounted on one side of said panel member adjacent opposite side edges and engagement members for pivoting said clamping members from a first position that permits said clamping members to be inserted into said opening towards a second position where each clamping member extends behind an edge section of said structure, each engagement member being rigidly connected to a respective clamping member and pivotal therewith and being movable to an initial position to engage and to be actuated by an edge section of said structure as said attaching means is inserted into said opening, and biasing means for biasing the attaching means to swing said clamping members to said second position and releasably clamp edge sections of the structure between said panel member and said clamping members, wherein said access door can be removed from said opening by pulling said door away from said opening and thereby overcoming a force applied to the attaching means by said biasing means.

2. An access door according to claim 1 wherein said attaching means include support members rigidly mounted on said one side of said panel member and projecting therefrom, said clamping members being pivotally mounted on said support members.

3. A removable access door for covering an opening in a structure comprising a panel member having opposite side edges, attaching means for removably attaching said panel member to said structure in order to cover said opening, said attaching means including support members rigidly mounted on one side of said panel member and projecting therefrom, clamping members pivotally mounted on said support members adjacent opposite side edges of said panel member, and engagement members for pivoting said clamping members from a first position that permits said clamping members to be inserted into said opening towards a second position where each clamping member extends behind an edge section of said structure, each engagement member being connected to a respective clamping member and being movable to an initial position to engage and to be actuated by an edge section of said structure as said attaching means is inserted into said opening, and biasing means for biasing the attaching means to swing said clamping members to said second position and releasably clamp edge sections of the structure between said panel member and said clamping members, wherein said biasing means is a coil spring connected at one end to each engagement member and wherein said access door can be removed from said opening by pulling said door away from said opening and overcoming a force applied to the attaching means by said biasing means.

4. An access door according to claim 3 wherein each clamping member and its respective engagement member together form an integral L-shaped member, with both the clamping member and its engagement member extending from a pivot axis about which both are pivotable.

5. An access door according to claim 3 wherein said coil spring is connected at one end to one of the engagement members and is connected at its opposite end to another of said engagement members.

6. An access door according to claim 4 wherein in said first position, each clamping member is held in place by said coil spring pulling on the respective engagement member with the spring being positioned relative to the engagement member and said pivot axis so that the pulling force of said spring on the engagement member tends to pivot the respective clamping member about said pivot axis in the direction of said first position.

7. An access door according to claim 6 wherein a stop is formed by each clamping member so as to limit the pivotal movement thereof about said pivot axis, said stop pressing against one side of said coil spring when the clamping member has reached said first position.

8. An access door according to claim 5 wherein said panel member has a peripheral edge section that is tapered in the radial outwards direction so that the peripheral edge of said panel member is thinner than a central area thereof.

9. A removable access door for covering a suitable opening in a structure, said door comprising a panel member having first and second sides and opposite side edges, attaching means for removably attaching said panel member to said structure in order to cover said opening, said attaching means including clamping members pivotally mounted on said first side of said panel member and each at a respective one of said side edges and engagement members for pivoting said clamping members from a first position that permits said clamping members to be inserted into said opening towards a second position where each clamping member extends behind an edge section of said structure, each engagement member being rigidly connected to a respective clamping member and pivotal therewith and being movable to an initial position to engage and to be actuated by an edge section of said structure as said attaching means is inserted into said opening, supporting means for pivotally supporting each clamping member and engagement member, said supporting means being rigidly connected to said first side, and spring means capable of pivoting each clamping member to said second position and causing the adjacent edge section of the structure to be clamped between said first side of the panel member and the clamping member, wherein said door can be removed from said opening by pulling thereon and thereby overcoming a clamping force generated by said spring means.

10. An access door according to claim 9 wherein said supporting means includes a flange that projects perpendicularly from said panel member and is spaced from an adjacent side edge of the panel member.

11. A removable access door for covering a suitable opening in a structure, said door comprising a panel member having first and second sides and opposite side edges, attaching means for removably attaching said panel member to said structure in order to cover said opening, said attaching means including clamping members pivotally mounted on said first side of said panel member and each at a respective one of said side edges and engagement members for pivoting said clamping members from a first position that permits said clamping members to be inserted into said opening towards a second position where each clamping member extends behind an edge section of said structure, each engagement member being connected to a respective clamping member and being movable to an initial position to engage and to be actuated by an edge section of said structure as said attaching means is inserted into said opening, supporting means for pivotally supporting each clamping member, said supporting means being rigidly connected to said first side, and spring means capable of pivoting each clamping member to said second position and causing the adjacent edge section of the structure to be clamped between said first side of the panel member and the clamping member, wherein said spring means is a coil spring, an end of the coil spring is connected to each engagement member, and said door can be removed from said opening by pulling thereon and overcoming a clamping force generated by said coil spring.

12. An access door according to claim 11 wherein each clamping member and its respective engagement member together form an integral L-shaped member when viewed from a side thereof.

13. An access door according to claim 12 wherein said coil spring is connected at one end to one of the engagement members and is connected at its opposite end to the other engagement member.

14. An access door according to claim 12 wherein in said first position, each clamping member is held in place by said coil spring pulling on the respective engagement member with the spring being positioned relative to the engagement member and said pivot axis so that the pulling force of said spring on the engagement member tends to pivot the respective clamping member about said pivot axis in the direction of said first position.

15. An access door according to claim 14 wherein a stop is formed by each clamping member so as to limit the pivotal movement thereof about said pivot axis, said stop pressing against one side of said coil spring when the clamping member has reached said first position.

16. An access door according to claim 12 wherein each engagement member is split longitudinally by a central slot and a connecting pin extending across said slot joins said end of the coil spring to the engagement member.

* * * * *